United States Patent [19]

Brownhill

[11] 4,047,682
[45] Sept. 13, 1977

[54] FAN COWL TRANSLATION LOCK

[75] Inventor: Frank Denison Brownhill, Chaddesden, England

[73] Assignee: Rolls-Royce (1971) Limited, London, England

[21] Appl. No.: 732,072

[22] Filed: Oct. 13, 1976

[30] Foreign Application Priority Data

Oct. 28, 1975 United Kingdom ............... 44400/75

[51] Int. Cl.² ............................................. B64C 15/06
[52] U.S. Cl. ........................... 244/110 B; 239/265.29; 239/265.31; 60/226 A
[58] Field of Search ............... 244/110 B; 239/265.29, 239/265.31; 60/226 A, 230, 232; 181/33 HB, 33 HD; 74/527

[56] References Cited

U.S. PATENT DOCUMENTS

| 3,460,762 | 8/1969 | Weise | 239/265.29 |
| 3,603,090 | 9/1971 | Billinger et al. | 239/265.29 |
| 3,604,662 | 9/1971 | Nelson et al. | 244/110 B |
| 3,931,944 | 1/1976 | Capewell | 244/110 B |

Primary Examiner—Stephen G. Kunin
Assistant Examiner—Galen L. Barefoot
Attorney, Agent, or Firm—Cushman, Darby & Cushman

[57] ABSTRACT

A gas turbine engine cowl has a portion which translates axially of the remainder, to open or close a reverser gas flow gap. A yoke is attached to the fixed cowl upstream of the gap which yoke is engageable with a member on the translating cowl portion, by dropping thereover as the cowl portion closes the gap. Translation of the cowl portion actuates an abutment via a cam mechanism to release the yoke at such a time as to prevent the yoke dropping too soon, which would result in the cowl portion being unlocked.

5 Claims, 3 Drawing Figures

U.S. Patent    Sept. 13, 1977    4,047,682
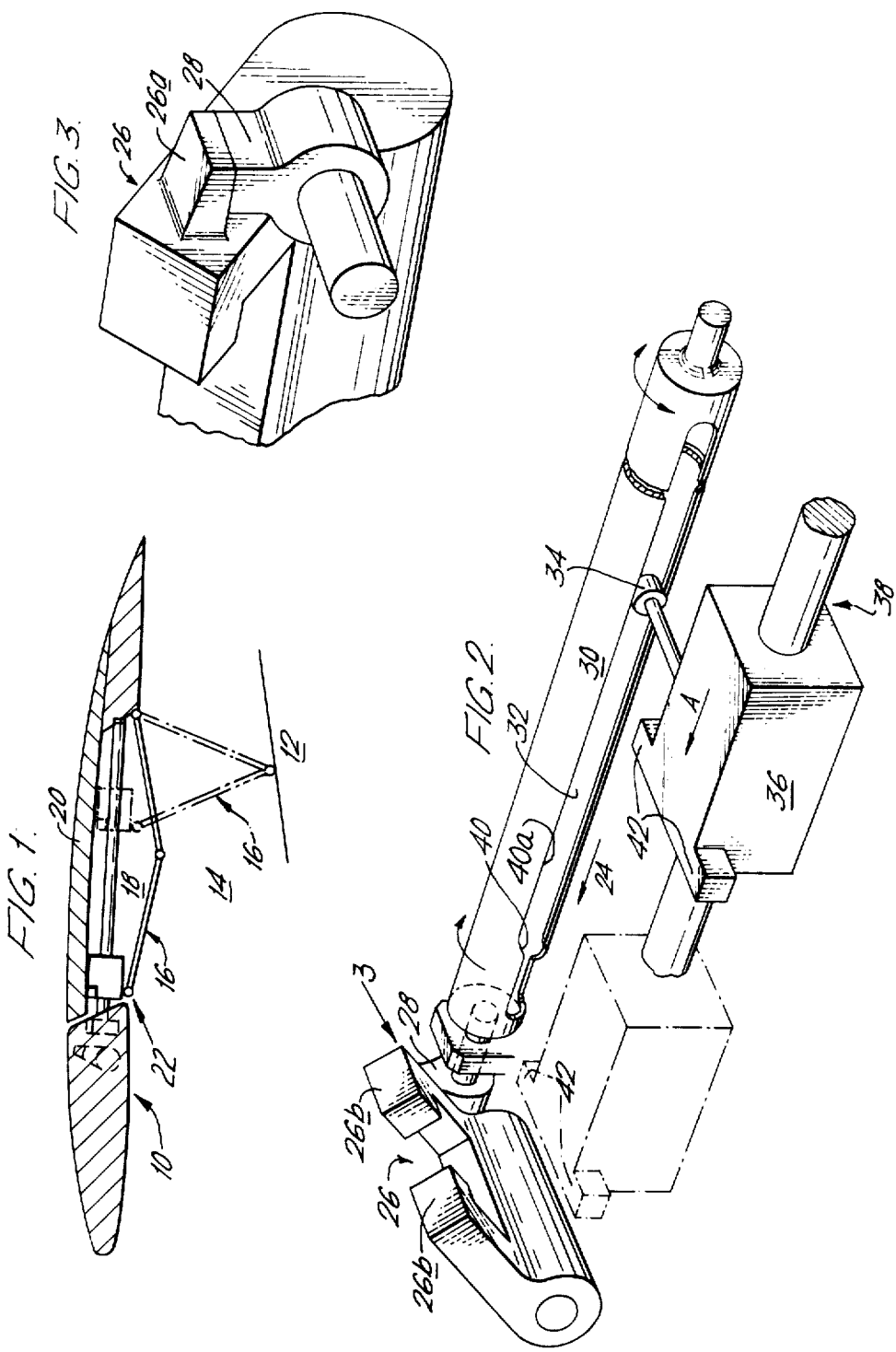

FAN COWL TRANSLATION LOCK

This invention concerns an anti translation lock for translatable cowls on gas turbine engines.

Gas turbine engines are normally enclosed in cowl structures, particularly those gas turbine engines utilised for the purpose of propelling aircraft. It is common for the cowl to be provided with portions which translate relative to the remainder, so as to uncover such devices as auxiliary air intakes or thrust reverser mechanisms. It is also common for those features to include cowl portions which move to a position wherein fluid flow through the engine is diverted from a course axially of the engine, to some other course e.g., for the purpose of thrust spoiling or reversal.

It is important that such a cowl portion should not be able to translate to a position wherein an effect can be achieved opposite to that which is required on take off of an aircraft powered by engines having such cowls e.g. a cowl portion or reverser door should not be able to move to adopt a position which would create a flow which would adversely affect the manoeuvre. Thus it is a particular object of this invention to obviate the risk of inadvertent reciprocal translation of a cowl portion of a gas turbine engine whilst in use.

The present invention provides a gas turbine engine cowl structure, a part of which is translatable relative to the remainder, a latch operable to engage with said part and prevent said relative translation and latch operation delaying means comprising a latch abutment member which in one position abuts said latch to prevent said operation, said abutment member being mounted on a rotary member having a cam surface, cam surface engaging means adapted for moving into and out of engagement with said cam surface such that immediately prior to termination of translation of said part of said cowl, the cam surface engaging means engages the cam surface and rotates the abutment member via the rotary member, clear of said latch, thus allowing the latch to operate by engaging the translatable cowl part.

Said rotary member comprises a member mounted for rotation about an axis parallel with the direction of translation of said at least one translatable part.

Preferably the cam surface engaging means is adapted for movement with the at least one part of said cowl.

Preferably said rotary member is mounted for rotation about an axis which is fixed with respect to the at least one part of said cowl.

The rotary member may comprise a tube past which in operation, said cowl part translates and wherein the tube has a slot formed in at least one side which receives a cam surface engaging means in translatory relationship therewith; said slot having at least one end adapted to provide a cam surface for engagement by said cam surface engagement means so as to cause rotation of the tube.

Preferably said abutment member is integral with said rotary member.

The invention will now be described by way of example and with reference to the accompanying drawings in which:

FIG. 1 is a diagrammatic part view of a gas turbine engine cowl in accordance with the invention, FIG. 2 is an enlarged pictorial view of a latch mechanism in accordance with the invention, and FIG. 3 is a pictorial part view in the direction of arrow 3 in FIG. 2.

Referring to FIG. 1, a gas turbine engine which is suitable for use as an aircraft power plant comprises a cowl 10 surrounding a core gas generator 12. Parts 10 and 12 define a flow duct 14 for air which has been worked upon by a fan stage (not shown).

Airflow blocker doors 16 are movable from a position shown in full lines where they do not block the fan duct, to a position shown in dotted lines where they do block the fan duct, with the result that fan air is forced to turn into an aperture 18 in cowl 10.

The middle portion 20 of cowl 10 is translatable in upstream and downstream directions relative to the upstream and downstream cowl portions, thus it is connected to the upstream end 22 of blocker doors 16 so that both move together and when the movement is downstream, aperture 18 becomes open to atmosphere and fan air is ejected therefrom to spoil or reverse its thrust effect.

It is most important that cowl portion 20 is restained from movement in a downstream direction when an aircraft powered by a gas turbine engine incorporating the cowl, takes off or is cruising at altitude. Accordingly a latch mechanism 24 is provided and mounted in the upstream fixed cowl portion. The mechanism comprises a yoke shaped latch 26 pivotally mounted on said fixed cowl portion. The latch is movable to the position shown in FIGS. 1 to 3 by e.g., pneumatic means (not shown) actuated by the aircraft pilot and in order to ensure that the latch stays open a required time, an abutment 28 is provided and which is more clearly seen in FIG. 3. Abutment 28 is integral with a tube 30 which in turn is mounted for rotation about its longitudinal axis between the upstream and downstream fixed portions of cowl 10. A slot 32 is formed in the side of the tube and a roller 34 which is mounted from an adjacent side of the nut 36 of a ball screw and nut mechanism 38, is located therein. The ball screw and nut mechanism 38 is a well known apparatus and will not be described in detail. However, it is pointed out that the nut 36 is connected to translatable cowl portion 20 (FIG. 1) so as to translate it in upstream and downstream directions. Consequently roller 34 also translates along slot 32.

When it is desired to close aperture 18 (FIG. 1) the ball screw and nut mechanism 38 is actuated by air motors (not shown) in known manner and cowl portion 20 moves upstream in the direction of arrow 'A' (FIG. 2) carried by nut 36. Roller 34 simultaneously moves along slot 32 until the cowl has almost closed aperture 18 whereupon roller 34 contacts a curved portion 40 of the sides of slot 32. Translation continues over the remaining very short distance and as a result, tube 30 is rotated by the cam action between roller 34 and slot side 40. The consequence of the rotation is that abutment 28 is rotated out of contact with an abutment feature 26a on latch 26 (FIG. 3). Latch 26 pivots downwards and its yoke portion 26b drops over and behind a pair of horns 42 on the upstream end of nut 36. Cowl portion 20 is now locked against translation in both upstream and downstream directions.

When it is desired to translate cowl portion 20 downstream e.g., when thrust reversal is required, the pilot operates control features (not shown) to lift latch 26 and, on receiving some signal e.g., a light on his instrument board, he actuates ball screw and nut mechanism 38 to translate the cowl and in consequence roller 34, which then acts on slot side portion 40a and causes tube 30 to rotate back to its original position, thus setting abutment 28 in its operative, latch blocking position.

The invention has been described herein, in connection with a gas turbine engine having a fan cowl. However, it will be appreciated that the invention can be used without modification on an ordinary gas turbine engine. Moreover, a rotor disc (not shown) having a perphery including a shape identical with slot sides 40,40a could be substituted for tube 30. The important thing is that the cam action must not be arranged to operate before horns 42 can be embraced by yoke 26b.

I claim:

1. A gas turbine engine cowl structure comprising:
a first cowl part;
a second cowl part, said second cowl part being translatable axially of and relative to said first cowl part to open or close a gap;
a latch operable to engage said second cowl part to prevent relative translation of said first cowl part and said second cowl part to open the gap; and
latch operation delaying means comprising a movable latch abutment member which in one position abuts said latch to prevent said latch from engaging said second cowl part, said abutment member being mounted on a rotary member, said rotary member comprising a tube having a slot in one side thereof with one end of the slot formed into a cam surface, cam surface engaging means for engaging said slot and for causing rotation of said tube when engaging the cam surface of said slot, said cam surface engaging means engaging said cam surface immediately prior to termination of relative translation of said first cowl part and said second cowl part when closing the gap to cause rotation of said tube with said abutment member clearing said latch whereby said latch can move into engagement with said second cowl part.

2. A gas turbine engine cowl structure as claimed in claim 1 in which said cam surface engaging means is operatively mounted on said second cowl part for movement therewith.

3. A gas turbine engine cowl structure as claimed in claim 1 wherein said first cowl part is fixed and said second cowl part is movable, said rotary member being operatively carried on said first cowl part an wherein said cam surface engaging means is operatively mounted on said second cowl part for movement therewith.

4. A gas turbine engine cowl structure as claimed in claim 1 wherein said cam surface engaging means comprises a roller mounted for translation with said second cowl part, said roller engaging said slot in said tube and acting upon said cam surface immediately prior to the termination of the relative translation of the first cowl part and second cowl part to close the gap.

5. A gas turbine engine cowl structure as claimed in claim 1 wherein said rotary member is mounted for rotation about an axis parallel with the direction of translation of said second cowl part.

* * * * *